(12) United States Patent
Vasicek

(10) Patent No.: US 12,151,404 B2
(45) Date of Patent: Nov. 26, 2024

(54) METHOD FOR THE CONTINUOUS THERMAL PROCESSING OF USED, DAMAGED OR OTHERWISE DEGRADED TIRES, AND A DEVICE FOR CARRYING OUT THIS METHOD

(71) Applicant: TYRECYCLE A.S., Smichov (CZ)

(72) Inventor: Alois Vasicek, Golcuv Jenikov (CZ)

(73) Assignee: TYRECYCLE A.S., Smichov (CZ)

( * ) Notice: Subject to any disclaimer, the term of this patent is extended or adjusted under 35 U.S.C. 154(b) by 128 days.

(21) Appl. No.: 17/639,646

(22) PCT Filed: Sep. 1, 2020

(86) PCT No.: PCT/IB2020/058142
§ 371 (c)(1),
(2) Date: Mar. 2, 2022

(87) PCT Pub. No.: WO2021/044298
PCT Pub. Date: Mar. 11, 2021

(65) Prior Publication Data
US 2022/0288814 A1 Sep. 15, 2022

(30) Foreign Application Priority Data
Sep. 1, 2020 (CZ) .................... CZ2019-568

(51) Int. Cl.
*C10B 49/04* (2006.01)
*B29B 17/02* (2006.01)
(Continued)

(52) U.S. Cl.
CPC ............. *B29B 17/04* (2013.01); *B29B 17/02* (2013.01); *C10B 1/04* (2013.01); *C10B 49/04* (2013.01);
(Continued)

(58) Field of Classification Search
CPC ........................... C10B 49/02–08; C10G 1/10
See application file for complete search history.

(56) References Cited

U.S. PATENT DOCUMENTS 1,208,453 A * 12/1916 Barnes .................... C10B 53/07
202/84
1,986,080 A * 1/1935 Still ....................... C10B 27/00
174/15.1
(Continued)

FOREIGN PATENT DOCUMENTS

| CZ | PV2012-116 A | 3/2012 |
| CZ | PV2014-534 A | 2/2016 |

(Continued)

OTHER PUBLICATIONS

Espacenet translation of RU 2276170.*
(Continued)

*Primary Examiner* — Jonathan Luke Pilcher
(74) *Attorney, Agent, or Firm* — WRB-IP PLLC

(57) ABSTRACT

Continuous thermal processing of used or damaged tires carried out by thermal decomposition in a closed vertically oriented reaction space in the presence of a controlled flow of air blowing into it from below, by the action of flue gases passing from the tires ignited at the bottom of the reaction space upwards, along the tires stacked and continuously replenished in the reaction space to form their thermal decomposition products, discharged from the reaction space to be further processed.

1 Claim, 3 Drawing Sheets

(51) Int. Cl.
  *B29B 17/04* (2006.01)
  *C10B 1/04* (2006.01)
  *C10B 53/07* (2006.01)
  *C10G 1/10* (2006.01)
  *B29B 17/00* (2006.01)

(52) U.S. Cl.
  CPC ............... *C10B 53/07* (2013.01); *C10G 1/10* (2013.01); *B29B 2017/0089* (2013.01); *B29B 2017/0496* (2013.01)

(56) References Cited

U.S. PATENT DOCUMENTS

| | | | | |
|---|---|---|---|---|
| 2,420,999 | A * | 5/1947 | Ayers | C09C 1/487 |
| | | | | 422/150 |
| 3,829,558 | A | 8/1974 | Banks et al. | |
| 4,452,154 | A | 6/1984 | Kono et al. | |
| 4,474,524 | A * | 10/1984 | Kawakami | F27D 3/08 |
| | | | | 202/262 |
| 4,647,443 | A * | 3/1987 | Apffel | C21B 3/04 |
| | | | | 201/2.5 |
| 4,746,406 | A | 5/1988 | Timmann | |
| 4,889,698 | A * | 12/1989 | Moller | B01D 53/64 |
| | | | | 95/134 |
| 5,085,738 | A * | 2/1992 | Harris | C10B 49/14 |
| | | | | 201/3 |
| 10,487,266 | B1 * | 11/2019 | Tian | C10J 3/56 |
| 2008/0202983 | A1 * | 8/2008 | Smith | C10B 53/07 |
| | | | | 422/198 |
| 2008/0230365 | A1 * | 9/2008 | Bohr | C10B 53/07 |
| | | | | 202/99 |
| 2011/0303525 | A1 | 12/2011 | Jeon | |
| 2014/0250786 | A1 * | 9/2014 | Koyama | G01F 23/288 |
| | | | | 48/128 |
| 2015/0144476 | A1 * | 5/2015 | Anigurkin | C10B 49/04 |
| | | | | 202/121 |
| 2017/0166817 | A1 * | 6/2017 | Vasicek | C10B 53/07 |

FOREIGN PATENT DOCUMENTS

| | | |
|---|---|---|
| CZ | 306376 | 11/2016 |
| DE | 4447357 A1 | 6/1996 |
| EP | 1785248 A1 | 5/2007 |
| EP | 2343350 A2 | 7/2011 |
| GB | 1481353 A | 7/1977 |
| JP | S55160087 A | 12/1980 |
| JP | H067766 A | 1/1994 |
| RU | 2276170 C2 * | 5/2006 |
| WO | 9916848 A1 | 4/1999 |
| WO | 2008053571 A1 | 5/2008 |
| WO | 2018022609 A1 | 2/2018 |

OTHER PUBLICATIONS

International Search Report (Dec. 3, 2020) for corresponding International App. PCT/IB2020/058142.

CZ Search Report (Mar. 5, 2020) for corresponding CZ application PV 2019-568.

* cited by examiner

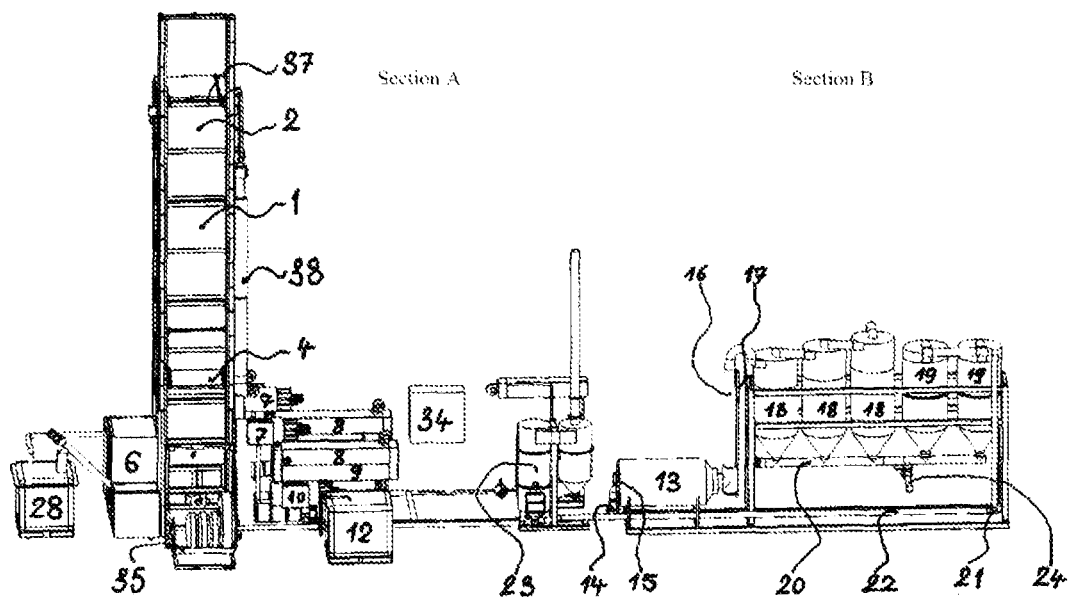
[Fig. 1]

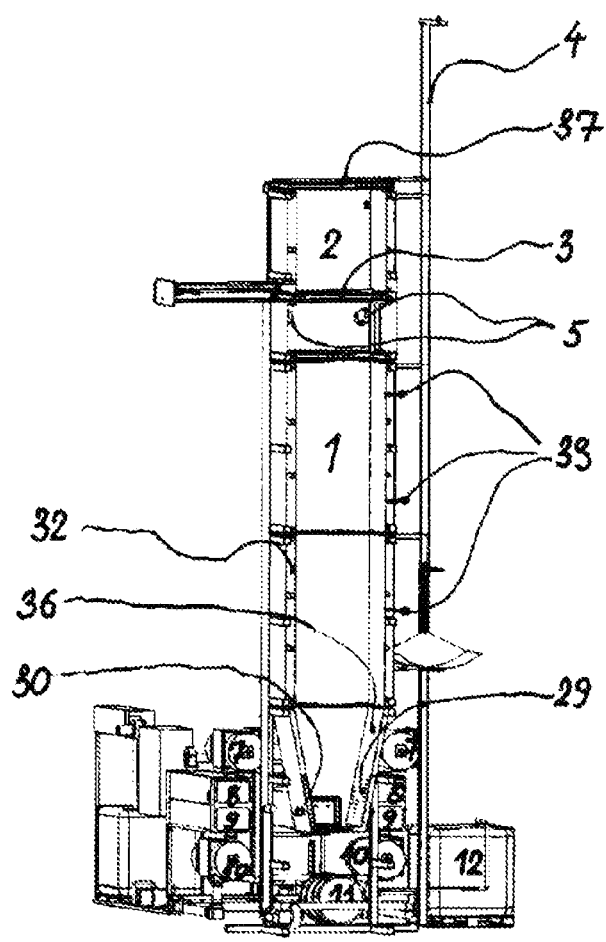
[Fig. 2]

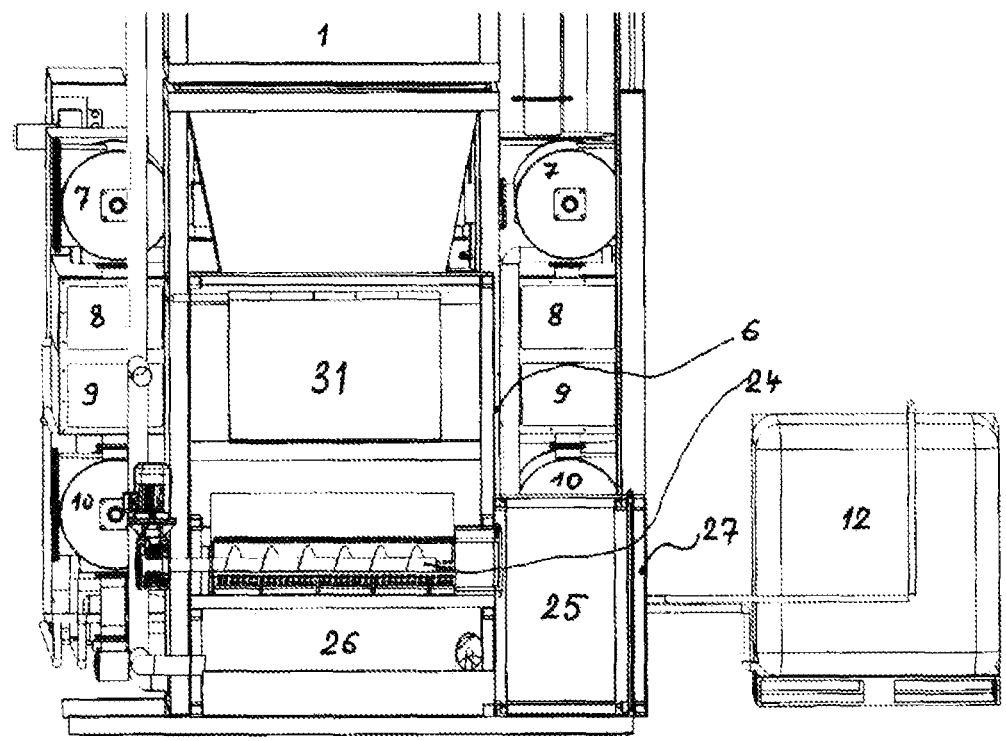
[Fig. 3]

METHOD FOR THE CONTINUOUS THERMAL PROCESSING OF USED, DAMAGED OR OTHERWISE DEGRADED TIRES, AND A DEVICE FOR CARRYING OUT THIS METHOD

BACKGROUND AND SUMMARY

The invention relates to a method for the continuous thermal processing of used, damaged or otherwise degraded tires into raw materials directly usable in the rubber industry, as well as into other products usable in the industry as raw materials or energy, and to a device for carrying out this method.

The ever-increasing number of vehicles brings with it an increasing number of used tires, and even extensive measures are not able to prevent the increasing accumulation of their environmental burden. The original measures preferred methods of the so-called recycling, in which steel cords were mechanically extracted from tires and the rest was ground into small particles, from which steel particles were still magnetically extracted and the crumb was used in construction or for the production of various exterior surfaces. This method of recycling is still a recognized procedure and is legislatively favoured by the release of recycling fees for it. However, the demand for production is limited, as it is able to processing up to a maximum of 10% of the annual production of used tires. Other methods of tire disposal are direct combustion methods, which use the combustion heat of rubber. Due to the fact that rubber contains sulphur as a vulcanizing agent, the combustion can only be carried out in processes where the resulting sulphur dioxide is chemically bound. Such combustion sites are mainly cement works, where sulphur dioxide is bound to calcium oxide to form gypsum. In this way, up to 30% of tire production is disposed of, with tires disappearing in cement works, including steel cords.

JPS55160087 discloses processing of tires by thermal decomposition in a closed cylindrical space in which the tires are placed vertically on top of each other. The closed cylindrical space was terminated in its lower part by a grate, under which the remains of the tires were burnt, while the steel reinforcement of the tires was pushed out of this space. From a practical point of view, however, this solution could not be able to operate efficiently, because the flue gases passing through the centre of the tire column as the path of least resistance did not have the possibility to heat these tires to the decomposition temperature. A similar procedure is the subject of, for example, U.S. Pat. No. 4,452,154, according to which tires are partially combusted in several zones, the last phase of the process ending in water, from where undecomposed tire parts are discharged and sorted, or of JPH067766A. However, these are generally discontinuous processes as in the further document WO2018022609, according to which the tires are combusted at temperatures of 800 to 1300° C. and at the same time depolymerized in horizontally or vertically arranged retorts at temperatures of 150 to 550° C. The solution according to WO9916848, which is carried out in sublimation chamber systems, can be considered as a partially continuous method of tire processing.

The pyrolysis processes, sometimes referred to as 'dry distillation', are also used to recycle tires, in which the disintegrated mass is enclosed in a reactor sealed against the ingress of air and heated by an external source of heat above the decomposition temperature. In the pyrolysis process, light hydrocarbons are released in the first stage of the reaction and, with the heating time, heavier fractions are released, until finally the so-called carbonation residue remains in the reactor. This condition is limiting from a practical point of view, because on the one hand the composition of the products changes during the reaction and on the other hand it cannot be carried out continuously, while external heating burdens the profitability of the operation. Another disadvantage of pyrolysis processes is the fact that they produce an excess of gaseous hydrocarbons, which are very difficult to store.

To a certain extent, these disadvantages of pyrolysis processes are eliminated, for example, in the solution contained in WO2008053571, according to which a continuous pyrolysis process is made possible by the fact that in spaces from which new mass is introduced into the reactor or from where carbonation residues are removed from it, an inert gas overpressure is created before they are opened. Liquefaction of pyrolysis gases is then the subject of U.S. Pat. No. 4,746,406. U.S. Pat. No. 3,829,558 addresses the problem of poor heat transfer through the mass by introducing a heated inert gas into the reactor, which is obtained by combustion in external exchangers. A further improvement of pyrolysis is the subject of US 2011/0303525, in which a carrier gas is used to accelerate the process. This gas is based on methane, ethane, propane, butane, pentane, hexane and amines of these substances.

In recent years, the so-called plasma technologies have been used to process waste. These technologies are based on heating the mass inside the reaction vessels using plasma torches. Heating gas and compressed air enter these torches under overpressure. Torches being similar to rocket engines heat the mass inside the reactor to several thousand ° C., at which gas, mostly methane, is formed from the organic matter after decomposition, which, after cooling, is used as energy in energy sector. Inorganic matter from waste is sintered at high temperatures and usually ends up in landfills. The advantage of these technologies is that they process all the mass or minimize the volume of any inorganic waste. However, they have a significant disadvantage of not very favourable ratio of the required input energy to the energy obtained.

From the Czech records, a solution according to CZ 306376 is known from this area, the subject of which is a method of continuous production of liquid and gaseous fuels from the part of organic substances in waste. At first glance, the ratio of input energy to energy obtained seemed very favourable. This method uses thermal heat for thermal decomposition, obtained by burning carbonized residues from decomposed organic mass. In practice, however, its significant shortcoming has manifested itself in the limitation of not allowing production capacity to be increased. In this case, the heating intensity is increased by the amount of incoming air. Due to the fact that other organic substances are released from the surface of the carbonized particles of the already decomposed mass, which burn, the excess oxygen from the air increases at a certain limit point, which can lead to explosive combustion and to a reduction in the yield of production. This method was applied, for example, in the construction of equipment known from CZ 305732 entitled 'Device for continuous thermal processing of used or otherwise degraded tyres'. This is where the negative effect manifested itself the most, because rubber from used tires, even after thermal removal of hydrocarbons from polyisoprene or polybutadiene, does not break down into dust, but retains its shape until it is broken by mechanical forces. Before this happens, there is a highly porous mass inside the reactor that is unable to trap all the oxygen from the air to control the reaction temperature. The above-mentioned methods of processing waste polymers, but in particular tires, have one common disadvantage, and that is the fact that essentially only fuels are obtained from polymer materials. These methods for the recycling itself, i.e. the use of the resulting products for the production of raw materials for the rubber industry, thus bring no benefit. They remain only at the level of energy use, but even this energy use has its limitations, as the products are contaminated with sulphur from the previous vulcanization of tire rubber.

The above-mentioned drawbacks of the prior art are largely eliminated by the method for the continuous thermal processing of used, damaged or otherwise degraded tires into raw materials directly usable in the rubber industry, as well as into other products usable in the industry as raw materials or energy, and the device for carrying out this method according to aspects of the invention. The continuous thermal processing of these tires is carried out by their thermal decomposition in a closed vertically oriented reaction space in the presence of a controlled flow of air blowing into it from below, by the action of flue gases passing from the tires ignited at the bottom of the reaction space upwards, along the tires stacked and continuously replenished in the reaction space to form their thermal decomposition products, discharged from the reaction space to be further processed.

The essence of the process according to an aspect of the invention lies in the fact that in its first starting phase the reaction space is filled with tires to be processed, which are ignited at its bottom with a maximum air supply, then in the second phase after reaching a temperature of 700 to 850° C. in the lower part of the reaction space and a temperature of 150 to 250° C. in the upper part of the reaction space, by reducing the air supply, these temperatures in both parts of the reaction space stabilize at their constant values. At these constant temperature values in both parts of the reaction space, the thermal decomposition of the processed tires takes place in this second phase at least until such a number of tires is gradually added to the reaction space with restricted air access from its surroundings, that the proportion of their weight, expressed in kg, and the size of the transverse area of the reaction space, expressed in $m^2$, reaches a value of 1,900 to 2,100 and at the same time a hot carbon bed is formed at a height of at least 0.7 to 1.2 metres from the bottom of the reaction space. After this time, in the third phase, with the continuing thermal decomposition of the tires and their continuous replenishment in the reaction space, the equilibrium state is similarly set by increasing the air supply again with temperatures of 900 to 950° C. in the lower part of the reaction space and 380 to 450° C. in its upper part, at which the whole process is then maintained until its completion. During the whole process, an aerosol is discharged from the upper part of the reaction space for further processing, formed by gaseous products from the thermal decomposition of tires, in which micro particles from the decomposition of low molecular weight substances are dispersed, and solid residues of thermal decomposition of tires are removed from the lower part.

Continuous replenishment of the tires into the reaction space is made possible by the fact that by the action of the flue gases passing through the reaction space in the second and subsequent third phase of thermal decomposition along the tires stacked inside, they are heated, the tires soften when heated above 60° C. and when they reach temperatures above 300° C. their polymer mass decomposes, after which they are subject to deformations due to gravitational forces. This reduces their volume in the reaction space and the free space required for their replenishment opens up.

Temperatures of 700 to 850° C. in the lower part of the reaction space and 150 to 250° C. in the upper part of the reaction space in the second phase of thermal decomposition are at the same time optimal temperatures for the initial formation of the above-mentioned red-hot carbon bed. This bed is formed by hot soot with the content of steel cords, resulting from the destruction of the skeletons of the decomposed tires by the weight of the tire charge in the reaction space. Temperatures of 900 to 950° C. in the lower part and 380 to 450° C. in the upper part of the reaction space in the third phase of thermal decomposition are then optimal for the course of decomposition processes, their high efficiency and maximum level of safety.

The aerosol formed under these conditions of thermal decomposition of the tires and discharged from the upper part of the reaction space is thus a stable system of micro particles or micro droplets, dispersed in gaseous products of carbon bed oxidation, because during the decomposition of the rubber mass, each micro particle or micro droplet carries with it negative electrostatic charge. Charges of the same polarity repel each other, so in this system the products do not liquefy even below the boiling temperatures of the individual low molecular weight substances.

The essence of the method according to an aspect of the invention further lies in the fact that the aerosol formed in the reaction space and discharged from its upper part for further processing is preferably after its partial cooling to a temperature of 180 to 250° C., which is carried out in an outlet cooling line in which the aerosol is passed through its inner part and air is blown countercurrently to it under the outer jacket, gradually cooled in at least two consecutive cycles. In these cycles, the aerosol is simultaneously subjected to the separation of liquid and gaseous phases by the action of frictional mechanical forces in separators that in order that at the end of this process the carrier gas leaves at the lowest possible temperature and with a minimum amount of residual liquid parts of the products not separated from the aerosol. Although the collected liquid products can be classified as liquid fuels, however, unlike all known solutions, they can be advantageously used in the process of production of full-fledged and reusable rubber soot, which is carried out in a retort made of refractory ceramic material, where they are gasified and after complete dispersion in a sub-stoichiometric amount of air, they are combusted in it at temperatures from 1100 to 1500° C. and at a mixing ratio of 3 to 7 parts by weight of air per one part by weight of incoming liquid. The flue gases leaving the retort are then cooled by dispersing the water in the drain pipe from the retort to a temperature of 250 to 300° C., after which the gases thus cooled pass through a system of cyclones and bag filters to separate the soot from the gases. The gases from this process are discharged to an energy plant in which CO is burned and sulphur dioxide is captured at the addition of calcium oxide or carbonate so that it does not escape into the air. Energy gypsum ($CaSO4$) leaves the desulphurisation node, also intended for its further practical use.

The essence of the method according to an aspect of the invention also lies in the process of recovering steel from steel cords and also of recovering carbon from decomposed tires. At a sufficient height of the carbon bed, the hot mass is forced out of the reaction space into a secondary space, secured against the ingress of air, in which the steel wires are separated from the rest of the carbon and, when hot, these wires are mechanically compressed or wound into twines. The steel part of this output is collected in the space created for this purpose and is periodically removed from there. The hot residue of the carbon bed falls through a sieve during the mechanical processing of the wire into the lower part of the space below the reactor, where its temperature is reduced by sprinkling with water, and is discharged into a tank outside the spaces connected to the reactor.

The reaction of the tire decomposition in the reaction space by the method according to an aspect of the invention is preferably carried out under a slight negative pressure of 5 to 10 kPa, thus preventing emissions of reaction products into the air through any structural leaks in the equipment.

The device for carrying out this method consists of or comprises a reactor for thermal decomposition of tires, in the upper part of which a feeding chamber is arranged with a conveyor for loading it with processed tires and for their continuous replenishment in the interior of the reactor, below which at least one outlet is arranged for discharging an aerosol formed by gaseous products from the thermal decomposition of tires with dispersed micro particles of low molecular weight substances, and in its lower part an outlet chamber for expelling solid residues of this thermal decomposition is arranged. The essence of an aspect of the invention is that each outlet opening for aerosol discharge from the reactor is connected via a cooled pipe to a hot gas separator, the outlet of which is connected to an air-cooled tube cooler structurally connected to a water-cooled tube cooler, the outlet of which is connected to an inlet of a cold gaseous medium separator. Both separators are connected by their outlets for the discharge of liquid products via a collection vessel, their tank and a dosing pump to a retort with an air dispenser, from which the flue gases are led to a cooling zone with a system of water showers and a battery of cyclones to separate the soot formed in this battery to bag filters and their discharge by end screw conveyors outside the equipment. The separator of cold gaseous medium, which with its inlet receives already partially cleaned gas from coolers for its final purification, is then connected by its outlet, intended for discharge of gaseous products, to the end combustion unit for CO after-burning, energetic utilization of residual hydrocarbons in gases and elimination of $SO_2$ emissions in the flue gases, to which the outlets of gaseous components from the retort are also connected via a fan and a pipe. The outlet chamber in the lower part of the reactor is provided with an outlet screw conveyor for removing the excess hot mass from the lower part of the reactor towards the secondary space and for separating it into a fine carbon fraction and a steel wire fraction. At the same time, the reactor itself is equipped through its insulated jacket with a system of temperature sensors for measuring temperatures in its inner space over its entire height, which are connected by their outlets to the reactor control operating unit, to which the digital scale outlet with data on the mass of processed tires in its inner space is also connected.

In all operations related to the filling of the reactor or removal of falling off solid products, the enclosed spaces are filled with the gaseous environment of the reactor, these spaces being purged with air after closing to the reactor side and before their opening to the atmosphere, which, after passing through these spaces, ends up in the energy plant as air for the combustion of other organic residues. The dimensions of the length of the reactor base and the height of the reactor are in a preferred embodiment of an aspect of the invention in a height/length ratio of 4/1 to 8/1, which guarantees sufficient space for optimal course of reaction and sufficient gravitational force acting on the mass at the bottom of the reactor to deform skeletons of decomposed tires to carbon dust particles and steel cords. A conically downwardly narrowing profile of the preferred embodiment of the lower part of the reactor also contributes to the deformation collapse of the skeletons of the decomposed tires in the reactor.

During the operation of the entire device, physical quantities such as local temperatures in its individual parts, positions of individual sub-nodes and monitoring of the accumulated quantities of tires entering the reactor are continuously measured. These quantities serve as a basis for process control and for evaluating the moments of actuation of action elements for individual operations. In this case, the evaluation is performed by a computer, which also controls the individual action variables of the process.

An absolutely fundamental advantage of both the method and the device according to an aspect of the invention is that according to it, it is possible to obtain from processed tires not only higher quality products for their use in energy, but also starting raw materials for the rubber industry.

BRIEF DESCRIPTION OF DRAWINGS

The invention is further explained by means of drawings of an exemplary embodiment of the device for carrying out the method of thermal continuous processing of used, damaged or otherwise degraded tires according to the invention, where FIG. 1 shows the whole assembly of this device, FIG. 2 shows a section of its reactor and FIG. 3 shows a detail of the lower part of this reactor.

DETAILED DESCRIPTION

According to FIG. 1, the device for carrying out the method in the illustrated exemplary embodiment of the invention consists of or comprises two technological units, namely section A and section B. Section A includes all technological operations concerning tire decomposition, and section B then serves to process the obtained liquid hydrocarbons and produce rubber soot, wherein in the technological nodes associated with the elimination of sulphur dioxide, both these sections use a common end element of energetic after-burning of gases.

Section A is formed by a reactor 1, which is provided with a conveyor 4 in the form of a lift for loading its upper feeding chamber 2 with processed tires and for their continuous replenishment via this upper feeding chamber 2 into its inner reaction space. Reactor 1 is further provided with a control operating unit 34 and digital scale 35, delivering to the control operating unit 34 data on the amount of mass in the reactor 1. A closed outlet chamber 6 is connected to the reactor 1 in its lower part, in which devices for handling hot waste ashes and for their transport outside its space are located. Reactor 1 is further equipped with a pair of systems for the removal of gaseous products formed in it, for their cooling and their division into liquid and gaseous phases. Each of the systems consists of or comprises a hot gas separator 7, to the supply of which one of the branches of the discharge of these gaseous products from the reactor 1 is connected via a cooled pipe 38, the reactor being for this purpose, as can also be seen in FIG. 2, a pair of outlet openings 5. The outlet of the hot gas separator 7 is then connected to an air cooled tube cooler 8, which is structurally connected to a water-cooled tube cooler 9, the outlet of which is connected to the inlet of a cold gaseous medium separator 10. The separators 7 and 10 of both systems are connected by their outlets for the discharge of liquid products via unspecified shut-off valves to a collecting vessel 11 from which the liquid products are pumped into a reservoir 12 and from there they are dosed into section B. Still in section A, the gaseous products are passed from the last of the series of separators 10 via the closures of the individual branches with non-return valves to be after-burned to the end combustion unit 23 for energetic utilization of residual hydrocarbons in the gases and to eliminate $SO_2$ emissions in the flue gases. This unit 23 comprises a burner (not shown in more detail), an air heat exchanger, a dosing device intended for injecting calcium oxide or micronized limestone into the incoming air stream for combustion, and from the cyclone solids separator in the flue gases to capture the gypsum formed.

Section B in this exemplary embodiment is formed from the outside by a thermally insulated cylindrical retort 13 provided with a refractory lining with an internal diameter of 0.45 m and a length of 1.5 m, which is provided with an air dispenser 14 and is connected via a piston dosing pump 15 to a reservoir 12 of liquid products. The retort 13 is followed by a cooling zone 16 of the flue gases emerging from it, which consists of or comprises a set of water showers 1_7 and a battery of cyclones 18 for their further cooling and for the separation of the soot formed. The outlet of the last cyclone 18 is then connected to a pair of bag filters 19, wherein the resulting soot deposited at the bottom of both the cyclones 18 and the bag filters 19 are discharged outside the device by a pair of end screw conveyors 20. The gaseous products from the process of soot production are returned by a fan 21 through a connecting pipe 22 back to section A to the end combustion unit 23.

Another technological node of the device according to the invention is the part of solid waste management, which is connected to its outlet chamber 6 which is shown in more detail in FIG. 3. This part is formed by an outlet screw conveyor 24 for removing excess hot mass from reactor 1 towards the secondary space 25 and for its separation into a fine carbon fraction, falling through sieves in the walls of the outlet screw conveyor 24 into the collecting space 26, and into a steel wire fraction which is hot deformed by the outlet screw conveyor 24 and ends up as an irregularly compressed formation in the secondary space 25, from which it is periodically removed after opening the exit door 27. The reactor 1 is provided with a bottom door 31 in its lower part in order to remove excess hot mass, wherein the carbon fraction below the outlet screw conveyor 24 is cooled by spraying water to a temperature below 200° C. after re-closing the bottom door 31 and transferred to a sealed steel tank 28.

As can be seen in more detail in FIG. 2, the reactor 1 is provided via its insulated jacket 32 with a set of superimposed temperature sensors 33 at 1-metre distances for measuring temperatures in its interior over its entire height, and its lower part has a conically downwardly narrowing profile 36 with controlled air inlets 29 connected to the air supply via a pair of control valves 30. In this particular embodiment, the reactor 1 has the shape of a prism with a square base with an edge length of 1.1 m and its height from the bottom to the outlet openings 5 is 7 metres in this device. The feeding chamber 2, as also shown in FIG. 2, is equipped with a pair of feeding closures 3, 37 to prevent ingress of air into the reactor 1, of which the upper tilting feeding closure 37 is operated by mechanism of the conveyor 4 and the lower sliding feeding closure 3 is actuated autonomously.

In carrying out the method of thermal continuous processing of tires according to the invention, in this exemplary embodiment thereof, the tires to be processed are randomly stacked on top of each other in the closed space of the reactor 1 and ignited via an open door 31 at the bottom of the reactor 1. After flaring up, the bottom door 31 is closed and air is sucked into the closed space through the fully open control valves 30.

After reaching a mass temperature at the bottom of the reactor 1 of 750° C., the air flow is adjusted by throttling and opening the control valves 30 to reach a temperature of 820° C., wherein the free space in the reactor 1, after deformation and decomposition of the tires in its lower part, is continuously replenished by additional tires from the feeding chamber 2. During further gradual heating of the reactor 1, after establishing a temperature gradient of values between 700 and 850° C. in the lower part of the reactor 1 and 150 to 250° C. in its upper part, this equilibrium state is left without interfering with the regulation of air flow. In this state, a hot carbon layer is formed, the height of which is estimated from the number of tires introduced into reactor 1. After 2.5 hours of operation, the height of this bed was estimated to be about one metre. Then, the equilibrium state is set by the air supply control valves 30 with a temperature gradient of 900 to 950° C. in the lower part of the reactor and 380 to 450° C. in its upper part or at the outlet openings 5 in the reactor 1 of the gaseous products formed from the reactor. In this mode, 19,150 kg of tires were processed in 18 hours.

After a reserve of 800 litres, the liquid products began to be processed to soot in the retort 13. At a set flow rate of the dosing pump 15 of 600 litres per hour, the air flow to the retort 13 was set to such an amount that the average temperature of output gases was 1,280° C. The produced soot in the amount of 6,095 kg served as test samples for setting the application possibilities of this raw material in the rubber industry or other sectors.

INDUSTRIAL APPLICABILITY

The method and device according to the invention are widely applicable in the disposal of tires of different types and sizes while using quality products obtained from them.

REFERENCE SIGNS LIST

1—reactor
2—feeding chamber
3—lower feeding closure
4—conveyor
5—outlet opening
6—outlet chamber
7—hot gas separator
8—air-cooled tube cooler
9—water-cooled tube cooler
10—cold gaseous medium separator
11—collecting vessel
12—reservoir of liquid products
13—cylindrical retort
14—air dispenser
15—dosing pump
16—cooling zone
17—water showers
18—cyclones
19—bag filters
20—end screw conveyor
21—fan
22—connecting pipe
23—end combustion unit
24—outlet screw conveyor
25—secondary space
26—collecting space
27—exit door 28—tank
29—controlled air inlet
30—control valves
31—bottom door
32—insulated reactor jacket
33—temperature sensors
34—control operating unit
35—digital scale
36—conically narrowed profile
37—upper feeding closure
38—cooled pipe

The invention claimed is:

1. A device for carrying out a method of continuous thermal processing of used or damaged or otherwise degraded tires, comprising
a reactor for thermal decomposition of tires, the reactor having an upper part in which a feeding chamber is arranged with a conveyor for loading the feeding chamber with tires to be processed and for continuously replenishing the tires in an inner space of the reactor under the feeding chamber, the at least one outlet opening is arranged in the reactor for removal of aerosol formed by gaseous products of thermal decomposition with dispersed micro particles, and the reactor having a lower part in which an outlet chamber is arranged for expelling solid residues of the thermal decomposition,
wherein the at least one outlet opening is connected via a cooled pipe to a hot gas separator, an outlet of the hot gas separator being connected to an air-cooled tube cooler connected to a water-cooled tube cooler, an outlet of the water-cooled tube cooler being connected to an inlet of a cold gaseous medium separator, wherein both the hot gas separator and the cold gaseous medium separator are connected in series for discharge of liquid products via a collecting vessel, a reservoir and a dosing pump to a retort with an air dispenser, resulting flue gases from the retort being led to a cooling zone comprising a system of water showers, a battery of cyclones, and a plurality of bag filters to separate soot generated in the retort from the flue gas and discharge of the soot via terminal screw conveyors outside the device, and wherein the hot gas separator and the cold gaseous medium separator are both connected by outlets of the hot gas separator and the cold gas medium separator for discharge of gaseous products to a terminal combustion unit, the terminal combustion unit comprising
a burner,
an air heat exchanger,
a dosing device arranged to inject calcium oxide or micronized limestone into an incoming airstream for combustion, and
a cyclone solids separator in the flue gases arranged to capture gypsum, the terminal combustion unit providing for energetic utilization of residual hydrocarbons in the gaseous products and for elimination of $SO_2$ emissions in the flue gases, the terminal combustion unit being connected via a fan and a connecting pipe to outlets of the gaseous components from the retort,
wherein the outlet chamber in the lower part of the reactor is provided with an outlet screw conveyor for removing excess hot mass from the lower part of the reactor towards a secondary space and for separating the hot mass into a fine carbon fraction and a fraction of steel wires, and the reactor is provided with an insulated jacket of the reactor and with a set of temperature sensors for measuring temperatures in its an interior of the reactor along a height of the reactor, which temperature sensors are connected by outputs thereof to a controlling operating unit of the reactor together with an output of a digital scale with data on an amount of mass of tires processed in the interior of the reactor.

* * * * *